US006992450B2

(12) United States Patent
Nakajima et al.

(10) Patent No.: US 6,992,450 B2
(45) Date of Patent: Jan. 31, 2006

(54) ACTIVE MASS DAMPER

(75) Inventors: Kichio Nakajima, Tsuchiura (JP);
Akira Busujima, Ebina (JP); Yasushi Ito, Ebina (JP); Nobuhiko Suzuki, Ebina (JP); Toru Yuki, Ebina (JP)

(73) Assignee: Hitachi Via Mechanics Ltd., Ebina (JP)

( * ) Notice: Subject to any disclaimer, the term of this patent is extended or adjusted under 35 U.S.C. 154(b) by 0 days.

(21) Appl. No.: 11/039,947

(22) Filed: Jan. 24, 2005

(65) Prior Publication Data

US 2005/0162110 A1 Jul. 28, 2005

(30) Foreign Application Priority Data

Jan. 28, 2004 (JP) .............................. 2004-019895

(51) Int. Cl.
*H02P 7/00* (2006.01)
(52) U.S. Cl. ...................... 318/432; 318/434; 318/592; 248/636; 248/637; 248/638
(58) Field of Classification Search ................ 318/432, 318/434, 592, 433; 248/636, 637, 638
See application file for complete search history.

(56) References Cited

U.S. PATENT DOCUMENTS

| | | | | | |
|---|---|---|---|---|---|
| 3,916,279 | A | * | 10/1975 | Kawano et al. | 318/430 |
| 4,236,607 | A | * | 12/1980 | Halwes et al. | 188/379 |
| 5,020,444 | A | * | 6/1991 | Furutani et al. | 104/284 |
| 5,445,249 | A | * | 8/1995 | Aida et al. | 188/378 |
| 5,816,559 | A | * | 10/1998 | Fujimoto | 248/636 |
| 5,906,254 | A | * | 5/1999 | Schmidt et al. | 188/378 |
| 5,931,441 | A | * | 8/1999 | Sakamoto | 248/550 |
| 6,036,162 | A | * | 3/2000 | Hayashi | 248/550 |
| 6,771,354 | B2 | * | 8/2004 | Kato | 355/72 |

* cited by examiner

*Primary Examiner*—Rita Leykin
(74) *Attorney, Agent, or Firm*—Crowell & Moring LLP

(57) ABSTRACT

The invention provides an active mass damper by use of which a machining apparatus can be downsized. The active mass damper includes a support unit for supporting a weight movably and horizontally, a motor for driving the weight, and a controller for controlling the motor. A torque command signal to be given to a motor of an X-table and a torque command signal to be given to a motor of a Z-table are put into the controller of the active mass damper so that the motor for driving the weight can be driven by feed-forward control using the torque command signals and feedback control based on the displacement of the weight.

1 Claim, 4 Drawing Sheets

ACTIVE MASS DAMPER

FIELD OF THE INVENTION

The present invention relates to an active mass damper for use in a machining apparatus having a horizontally movable portion which can move horizontally desirably and, for example, a vertically movable portion which can move vertically desirably.

DESCRIPTION OF THE RELATED ART

For example, a laser drilling machine for drilling a printed circuit board or the like using a laser beam includes an X-table mounted on a bed movably horizontally, a Y-table mounted on the X-table movably horizontally and perpendicularly to the movable direction of the X-table, a fixed laser beam source, steerable reflecting mirrors for scanning the laser beam, and so on.

Prior to machining, the printed circuit board is zoned into to-be-processed regions each having predetermined dimensions. The center of anyone of the zoned to-be-processed regions is positioned at the center of the laser beam scanning area. After that, the to-be-processed region is scanned and machined with the laser beam. When drilling in the to-be-processed region is finished, the X-table and the Y-table are operated to move the printed circuit board and align the next to-be-processed region of the printed circuit board with the center of the laser beam. Such an operation is repeated till machining is finished.

Here, when the X-table is moved, a force equal to the product of the mass of the X-table and the members mounted on the X-table is generated horizontally by its acceleration in the laser drilling machine. The point of application of the force is above the floor. Accordingly, due to the moment of force depending on the force and the height of the point of application, a rotational vibration (rocking vibration) having a natural frequency depending on the rigidity of the floor and the moment of inertia of the laser drilling machine is generated in the laser drilling machine. The force transmitted from the leveling bolts disposed on one side of the laser drilling machine acts to press down the floor, while the force transmitted from the other leveling bolts acts to take up the floor, so as to put the center of gravity of the laser drilling machine therebetween. As a result, a vertical vibration is generated in the floor.

Also when the Y-table is moved, a vertical vibration is generated in the floor in the same manner as when the X-table is moved.

Thus, when the X-table or the Y-table is moved at a high velocity in order to improve the efficiency of machining, the vibration of the floor increases.

When the laser drilling machine is installed on the first floor of a well-founded building, the floor vibration does not increase so much. However, the second or higher floor often has less rigidity or mass than the first floor. Accordingly, when the laser drilling machine is installed on the second or higher floor, a large vibration and noise resulting from the vibration may occur in the floor during the operation of the laser drilling machine. Such vibration or noise does not only make workers feel uncomfortable but also causes deterioration in machining accuracy and machining efficiency. Further, repeated vibration may reduce the durability of the building.

Thus, there is a technique in which inertial force generating means (an active mass damper) comprising a support unit for supporting a weight movably horizontally and a weight drive unit for driving the weight is disposed on a bed of a machining apparatus having a horizontally movable portion which can move horizontally desirably and means for driving the horizontally movable portion, and the weight is moved based on an input signal put into the means for driving the horizontally movable portion, so that the force transmitted to the floor due to the movement of the horizontally movable portion can be reduced to prevent rocking vibration from occurring (Japanese Patent Laid-Open No. 2003-181739).

A drilling machine for drilling a printed circuit board or the like with a drill includes an X-table mounted on a bed movably horizontally, a Y-table mounted on a gantry frame fixed to the upper surface of the bed and allowed to move horizontally and perpendicularly to the movable direction of the X-table, a Z-table mounted on the Y-table movably vertically, and a spindle mounted on the Z-table and for rotating the drill. For machining a printed circuit board, the X-table and the Y-table are moved to align the center of a to-be-machined portion with the shaft center of the drill, and then the spindle is moved down to drill the printed circuit board.

When the aforementioned active mass damper is provided for the X-table and the Y-table, the vibration due to the movement of the X-table and the Y-table can be prevented from occurring in the drilling machine. However, in the drilling machine, also when the Z-table is moved, an force equal to the product of the mass of the Z-table and the members, such as the spindle mounted on the Z-table, by its acceleration is generated vertically, so that vertical vibration is generated in the floor due to the force. The point of application of the force does not coincide with the center of gravity of the drilling machine. Therefore, a rotational vibration (rocking vibration) having a natural frequency depending on the rigidity of the floor and the moment of inertia of the drilling machine is generated in the drilling machine in the same manner as when the X-table is operated.

Thus, when the Z-table is moved at a high velocity and at a high acceleration in order to improve the efficiency of machining, the vibration of the floor increases, so that the table mounted with a work vibrates due to the vibration of the floor, thereby resulting in lowering in the machining accuracy (positional accuracy of the center of perforation). In addition, the positioning control performance of the Z-table also deteriorates so that the accuracy of the machining depth is lowered.

However, when a conventional active mass damper is provided for the Z-table in order to reduce the force caused by the Z-table, the drilling machine as a whole bercomes large in size.

SUMMARY OF THE INVENTION

It is an object of the present invention to provide an active mass damper by use of which a machining apparatus can be downsized.

In order to attain the foregoing object, the invention provides an active mass damper comprising: a support unit for supporting a weight movably horizontally; a weight drive unit for driving the weight; and a controller for controlling the weight drive unit; wherein: the active mass damper is disposed in a machining apparatus (drilling machine) so that a movable direction of the weight is parallel to a movable direction of a first movable portion (X-table) of the machining apparatus; and the controller drives the weight drive unit so as to suppress vibration generated in the machining apparatus, employing feed-forward control using a torque command signal given to a drive portion of the first movable portion and a torque command signal given to a drive portion of another movable portion (Z-table) different in movable direction from the first movable portion, and feedback control based on a displacement of the weight.

By controlling the weight of the active mass damper provided for the X-table, the rocking vibration of the drilling machine due to the movement of the. Z-table can be suppressed surely without time delay. It is therefore unnecessary to provide another active mass damper for the Z-table. Thus, the drilling machine can be downsized. In addition, since, even when the Z-table is moved, the X-table doesn't vibrate, the machining accuracy is improved.

DESCRIPTION OF THE PREFERRED EMBODIMENT

Figure 1:
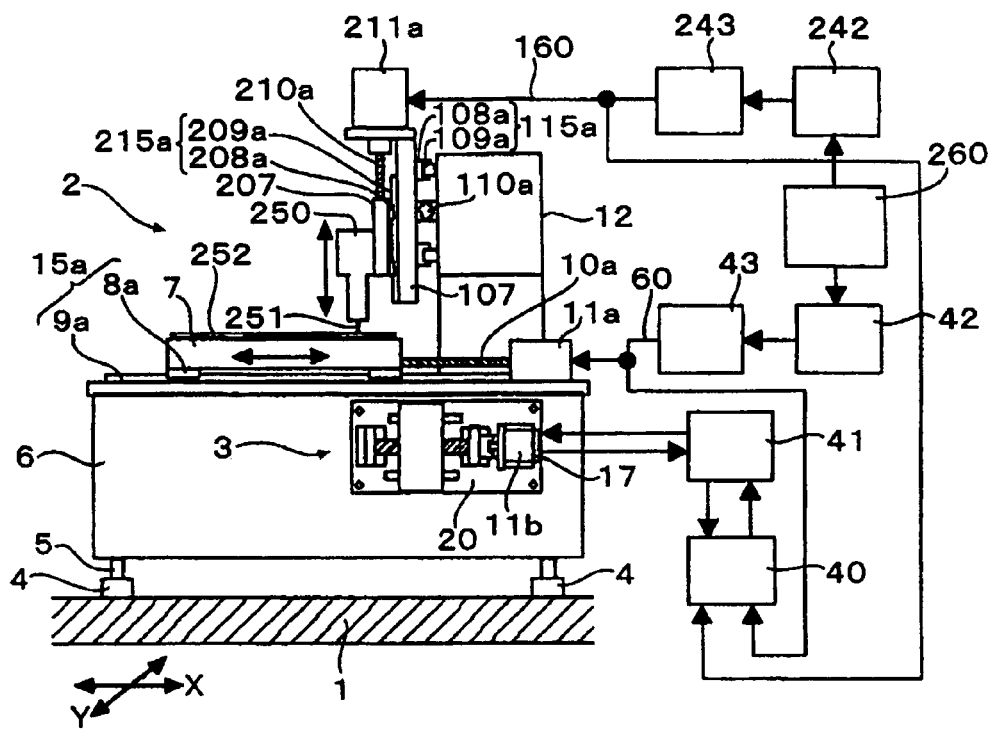
FIG. 1 is a side view of a drilling machine according to the invention.

The invention will be described below along its embodiment shown in the drawings.

Figure 2:
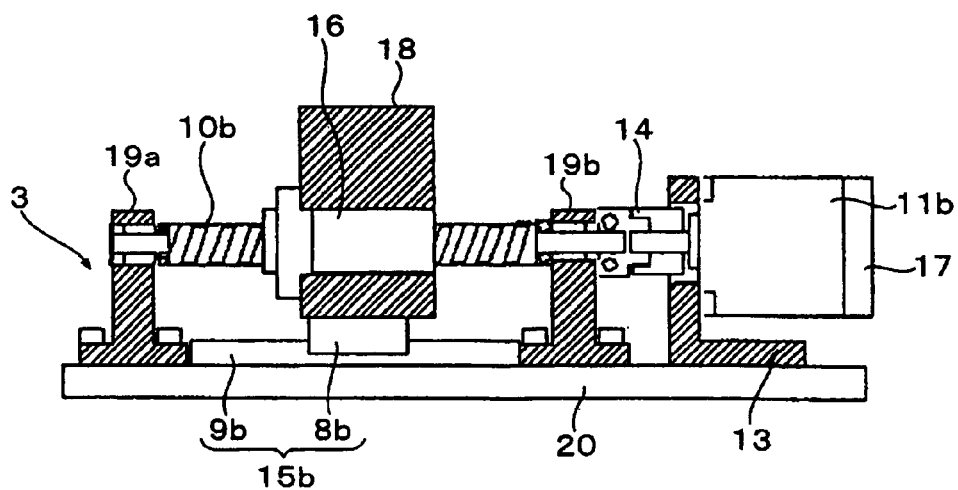
FIG. 2 is a sectional top view of an active mass damper according to the invention.
Figure 3:
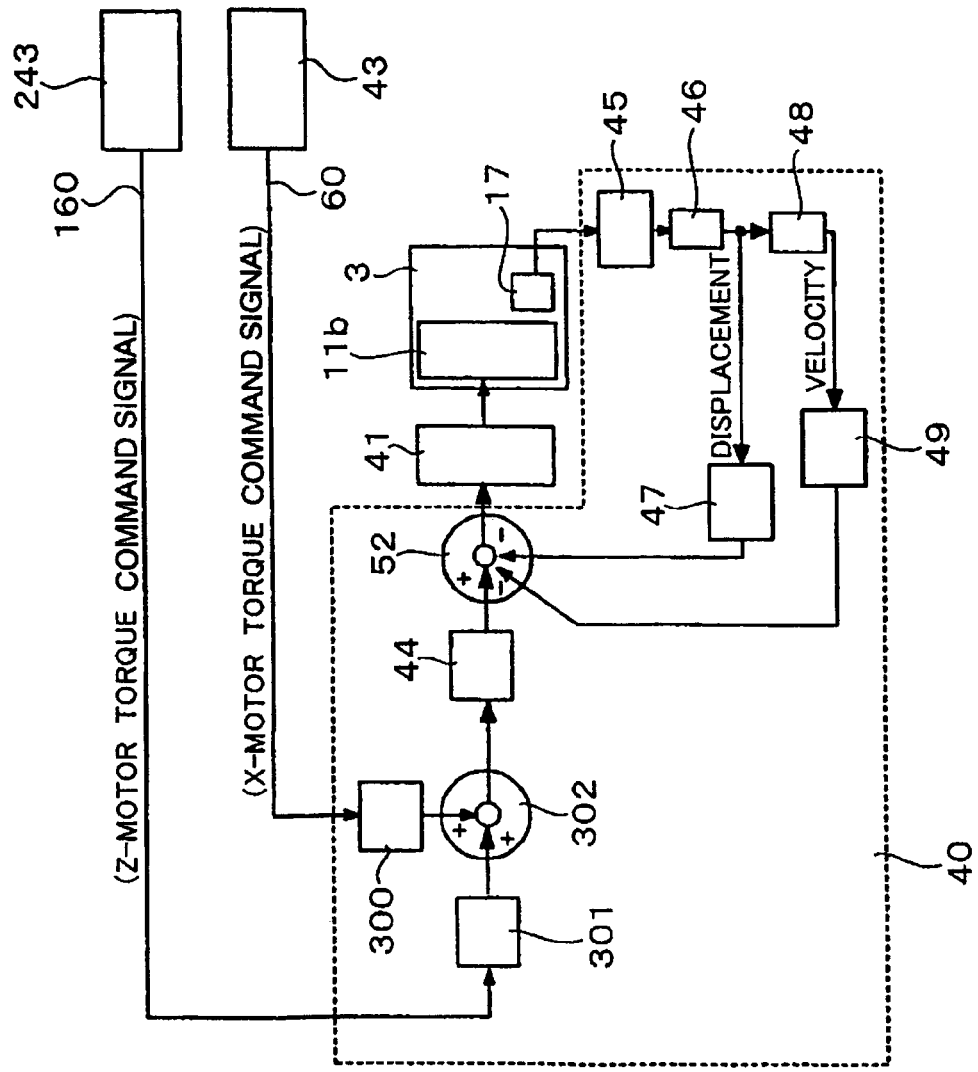
FIG. 3 is a control block diagram of the active mass damper according to the invention.

FIG. 1 is a side view of a drilling machine according to a first embodiment of the invention. FIG. 2 is a sectional top view of an active mass damper. FIG. 3 is a control block diagram of the active mass damper.

A bed 6 of a drilling machine 2 is supported on a floor 1 by leveling bolts 5 and block members 4. Rails 9a of a linear guide 15a are fixed to the upper surface of the bed 6. An X-table 7 is fixed to a slide unit 8a of the linear guide 15a movably in the left/right direction (X-direction) of FIG. 1. A not-shown ball nut retained on the X-table 7 is screwed to a ball screw 10a. The ball screw 10a is driven by a motor 11a. The motor 11a is driven by an X-motor driver 43 in accordance with a control signal output from an X-table driving controller 42. The X-table driving controller 42 constitutes a so-called positioning control system for positioning the X-table 7 in accordance with a position command signal from an operation controller 260 and a signal from a not-shown X-table position detector. A printed circuit board 252 is fixed onto the X-table 7.

Rails 109a of a linear guide 115a are fixed to a gantry frame 12 fixed to the upper surface of the bed 6. A Y-table 107 is fixed to a slide unit 108a of the linear guide 115a movably in a Y-direction perpendicular to the paper. A not-shown ball nut retained on the Y-table 107 is screwed to a ball screw 10a. The ball screw 110a is driven by a not-shown motor.

Rails 209a of a linear guide 215a are fixed to the Y-table 107. A Z-table 207 is fixed to a slide unit 208a of the linear guide 215a movably in the up/down direction (Z-direction) of FIG. 1. A not-shown ball nut retained on the Z-table 207 is screwed to a ball screw 210a. The ball screw 210a is driven by a motor 211a.

The motor 211a is driven by a Z-motor driver 243 in accordance with a control signal output from a Z-table driving controller 242. The Z-table driving controller 242 positions the Z-table 207 in accordance with a position command signal from the operation controller 260 and a signal from a not-shown Z-table position detector.

A spindle 250 for rotating a drill 251 is mounted on the Z-table 207.

The operation controller 260 moves the X-table 7 and the Y-table 107 individually so as to align the axis of the drill 251 with a to-be-machined position of the printed circuit board 252. The operation controller 260 then controls the Z-table 207 so as to drill the printed circuit board 252.

Here, one Z-table 207 or a plurality of Z-tables 207 may be mounted on the Y-table 107. When a plurality of Z-tables 207 are mounted on the Y-table 107, the drilling machine 2 is so long in the Y-direction that the amplitude of rocking vibration generated by the movement of the Y-table 107 can be reduced.

Next, the active mass damper 3 will be described in detail with reference to FIGS. 1 and 2. A motor stand 13, bearing stands 19a and 19b and rails 9b of a linear guide 15b, which are constituent parts of the active mass damper 3, are fixed to a pedestal 20. A weight 18 is supported on a slide unit 8b of the linear guide 15b movably in the X-direction. A ball nut 16 fixed to the inside of the weight 18 is screwed to a ball screw 10b. The ball screw 10b is supported rotatably on the bearing stand 19a, while one end portion of the ball screw 10b is connected to an output shaft of a motor 11b supported on the motor stand 13 through a coupling 14. An encoder 17 provided in the motor 11b is connected to a controller 40 through a driver 41 of the motor 11b. The controller 40 is connected to a signal output line 60 of the X-motor driver 43 and a signal output line 160 of the Z-motor driver 243.

As shown in FIG. 3, the input terminal of a coefficient multiplier 300 of the controller 40 is connected to the signal output line 60. The input terminal of a coefficient multiplier 301 is connected to the signal output line 160. The input terminal of an adder 302 is connected to the output terminal of the coefficient multiplier 300 and the output terminal of the coefficient multiplier 301, while the output terminal of the adder 302 is connected to the input terminal of a coefficient multiplier 44.

The input terminal of an adder 52 is connected to the output terminal of the coefficient multiplier 44, the output terminal of a coefficient multiplier 47 and the output terminal of a coefficient multiplier 49, while the output terminal of the adder 52 is connected to the input terminal of the driver 41. The encoder 17 is connected to the input terminal of the coefficient multiplier 47 and the input terminal of a differentiator 48 through a pulse counter 45 and a converter 46. The output terminal of the differentiator 48 is connected to the input terminal of the coefficient multiplier 49.

Next, the operation of this embodiment will be described.

Figure 4A:
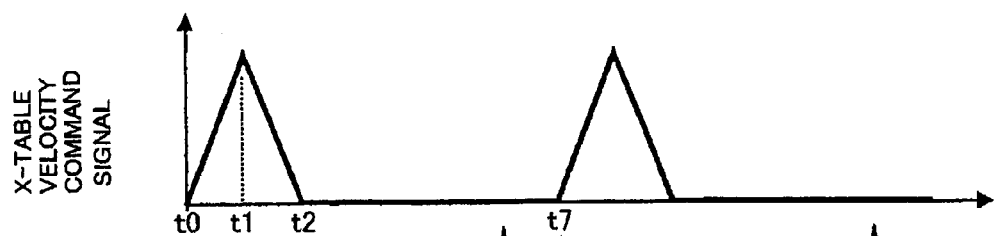
FIGS. 4A–4D are timing charts showing examples of time histories of velocity command signals and torque command signals.
Figure 4B:
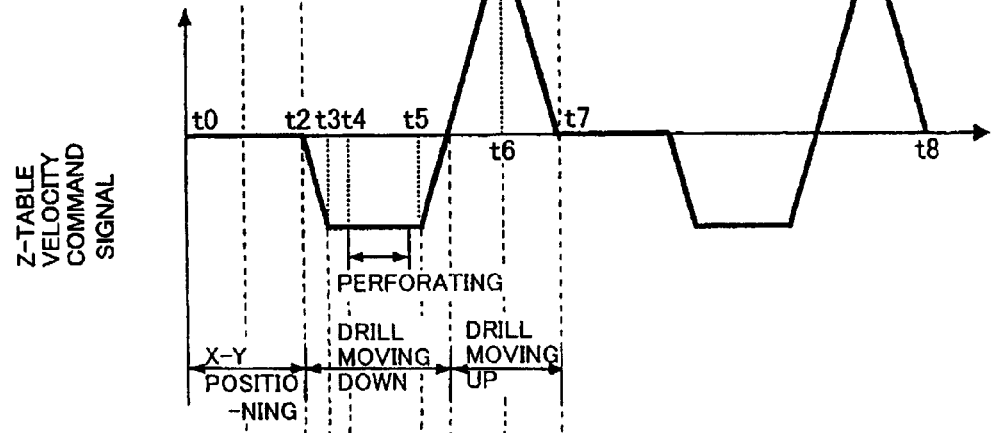
Figure 4C:
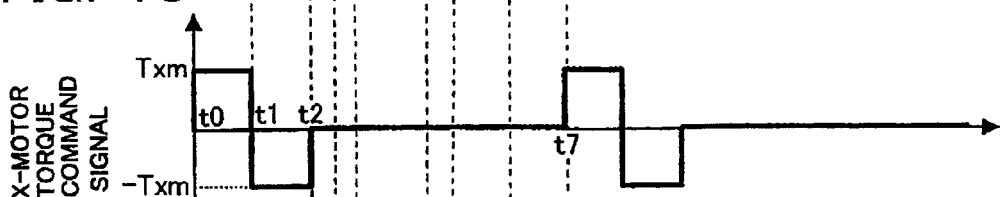
Figure 4D:
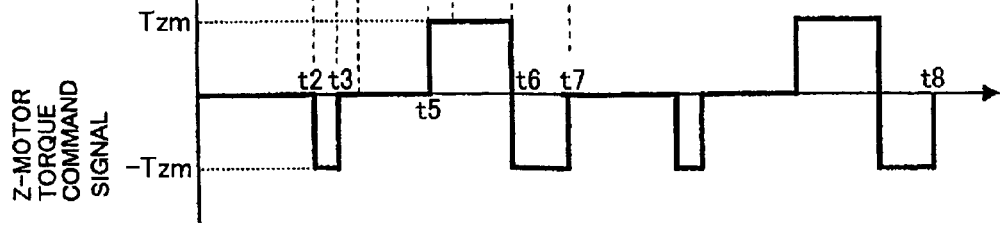

FIGS. 4A–4D are charts showing examples of time histories of velocity command signals and torque command signals. FIG. 4A shows a velocity command signal for the X-table 7. FIG. 4B shows a velocity command signal for the Z-table 207. FIG. 4C shows a torque command signal for the X-motor driver 43. FIG. 4D shows a torque command signal for the Z-motor driver 243.

Each of the velocity command signals shown in FIGS. 4A and 4B is obtained by a time derivative of a position command signal output from the operation controller 260. Each of the torque command signals shown in FIGS. 4C and 4D is obtained by a time derivative of the velocity command signal in FIGS. 4A, 4B. Here, since the X-table 7 and the Z-table 207 are inertial bodies, commanding torque is proportional to commanding acceleration.

In the following description, assume that the X-table positioning control system, the Z-table positioning control system and the active mass damper control system follow the velocity command signals and the acceleration command signals without delay, and the Y-table 107 is driven at the same timing as the X-table 7.

First, the operation of the drilling machine will be described.

As shown in FIG. 4C, the velocity of the X-table 7 is increased at a constant acceleration (torque) between a time t0 and a time t1, and decreased at a constant acceleration between a time t1 and a time t2. Thus, the X-table 7 is positioned.

Then, the velocity of the Z-table 207 is increased to move downward at a constant acceleration between the time t2 when the X-table 7 is completely positioned and a time t3. The acceleration is set to be zero between the time t3 and a time t5 so that the drill 251 is moved down at a constant velocity. At a time (for example, a time t4 in FIG. 4B) between the time t3 and the time t5, the tip of the drill 251 reaches the surface of the printed circuit board 252 and begins to drill therein. At the time t5, the perforation is completed.

After the time t5, the velocity of the Z-table 207 is increased to move upward at a constant acceleration till a time t6, and decreased at a constant acceleration between the time t6 and a time t7. At the time t7, the Z-table 207 is positioned in a standby position (where the Z-table 207 is located during machining, and the tip of the drill 251 is, for example, 1 mm distant from the surface of the printed circuit board 252).

One hole is completed in the operation from the time t0 to the time t7. The aforementioned operation is repeated (for example, between the time t7 and a time t8) till the printed circuit board 252 is completely machined.

As described above, the X-table 7 and the Z-table 207 are moved and stopped repeatedly with a sudden acceleration and deceleration pattern during drilling.

Next, the operation of the active mass damper 3 will be described. Here, the origin of movement of the weight 18 when machining is started (for example, at the time t0) is set at the center of the moving stroke of the weight 18.

Period (1) from Time t0 to Time t1

This is an acceleration period of the X-table 7. The X-motor torque command signal 60 is Txm. The X-motor torque command signal 60 output from the X-motor driver 43 is multiplied by a coefficient in the coefficient multiplier 300, and put into the adder 302. On the other hand, the Z-motor torque command signal 160 output from the Z-motor driver 243 is multiplied by a coefficient in the coefficient multiplier 301, and also put into the adder 302. However, the Z-table 207 is stopping in this period. Thus, the value of the Z-motor torque command signal 160 is zero. As a result, the output value of the adder 302 is equal to the output value of the coefficient multiplier 300.

The output of the coefficient multiplier 47 and the output of the coefficient multiplier 49 are subtracted from the output of the adder 302 multiplied by a coefficient in the coefficient multiplier 44. The result of the subtraction is put into the driver 41. Here, the sign of the signal put into the driver 41 depends on the sign of a current value supplied to the motor 11a. The sign of the signal put into the driver 41 is determined so that the acceleration direction of the weight 18 is opposite to the acceleration direction of the X-table 7.

As a result, the horizontal force generated when the X-table 7 begins to move is canceled (or reduced) by the horizontal force generated due to the movement of the weight 18. Accordingly, no rocking vibration occurs in the drilling machine 2, and no floor vibration occurs.

In such a manner, according to this embodiment, due to feed-forward control of the weight 18 using the torque command signal, occurrence of floor vibration can be prevented without time delay.

In addition, pulse signals output from the encoder 17 are counted by the pulse counter 45 and converted into a displacement of the weight 18. The obtained displacement is multiplied by a coefficient in the coefficient multiplier 47 and put into the adder 52 (that is, the displacement of the weight 18 is fed back to the driving signal of the motor 11b). At the same time, the displacement of the weight 18 is converted into a velocity signal by the differentiator 48, multiplied by a coefficient in the coefficient multiplier 49 and put into the adder 52 (that is, the velocity of the weight is fed back to the driving signal of the motor 11b). Thus, the weight 18 can be prevented from colliding with the bearing stand 19a, 19b or the like due to its excessive displacement.

Here, when the feedback control is too strong, the acceleration of the weight 18 becomes so low that the effect of reducing the floor vibration is lowered. Thus, the coefficient of the coefficient multiplier 47 is set at a proper value by experiments or the like.

Period (2) from Time t1 to Time t2

This is a deceleration period of the X-table 7, and the X-motor torque command signal 60 is -Txm.

In this case, the deceleration direction of the weight 18 is made opposite to the deceleration direction of the X-table 7 so that the horizontal force generated when the X-table 7 stops moving is canceled (or reduced) by the horizontal force generated due to the movement of the weight 18 in the same manner as in the aforementioned period (1). Accordingly, no rocking vibration occurs in the drilling machine 2, and no floor vibration occurs.

Period (3) from Time t2 to Time t3

This is an acceleration period of the Z-table 207, and the Z-motor torque command signal 160 is -Tzm. The Z-motor torque command signal 160 output from the Z-motor driver 243 is multiplied by a coefficient in the coefficient multiplier 301, and put into the adder 302. On the other hand, the X-table 7 is stopping in this period. Therefore, the value of the X-motor torque command signal 60 is zero. Thus, the output value of the adder 302 is equal to the output value of the coefficient multiplier 301.

After that, a signal by which the acceleration direction of the weight 18 is made opposite to the acceleration direction of the Z-table 207 is put into the driver 41 in the same manner as in the aforementioned period (1).

As a result, rocking vibration caused by the vertical force generated when the Z-table 207 begins to move is canceled (or reduced) by the horizontal force generated due to the movement of the weight 18. Accordingly, no rocking vibration occurs in the drilling machine 2, and no floor vibration occurs due to rocking.

In such a manner, according to this embodiment, due to feed-forward control of the weight 18 using the Z-motor torque command signal 160, occurrence of floor vibration can be prevented without time delay.

Period (4) from Time t3 to Time t5

This is a period when the X-table 7 is stopping, and the Z-table 207 is moving at a constant velocity. Thus, the values of the motor torque command signals 60 and 160 are zero. As a result, the weight 18 is brought back to its origin by the feedback control of the position and velocity of the weight 18.

Period (5) from Time t5 to Time t6

This is a period when the Z-table 207 is decelerated in the downward moving direction and accelerated in the upward moving direction. The Z-motor torque command signal 160 is Tzm.

In this case, the acceleration direction of the weight 18 is opposite to the downward moving deceleration direction and the upward moving acceleration direction of the Z-table 207. Thus, rocking vibration generated due to the movement of the Z-table 207 is canceled (or reduced) by the horizontal force generated due to the movement of the weight 18 in the same manner as in the aforementioned period (2). Accordingly, no rocking vibration occurs in the drilling machine 2, and no floor vibration occurs due to rocking.

Period (6) from Time t6 to Time t7

This is a deceleration period of the Z-table 207, and the Z-motor torque command signal 160 is −Tzm. In this case, the deceleration direction of the weight 18 is opposite to the deceleration direction of the Z-table 207. Thus, in the same manner as in the aforementioned period (5), no rocking vibration occurs in the drilling machine 2, and no floor vibration occurs due to rocking.

In the above description, it is assumed that the X-table positioning control system, the Z-table positioning control system and the active mass damper control system follow the velocity command signals and the acceleration command signals without delay. In fact, however, there is a response delay in each of the X-table positioning control system, the Z-table positioning control system and the active mass damper control system.

The behavior of the weight 18 when there is a response delay will be described below based on a simulation result.

The simulation was performed in the following procedure.

(1) Simulation models of the X-table positioning control system, the Z-table positioning control system and the active mass damper control system are produced.

(2) An X-table position command signal and a Z-table position command signal are input into the X-table positioning control system model and the Z-table positioning control system model so as to simulate the behavior of the X-table and the behavior of the Z-table respectively.

The moving direction of the X-table 7 is set to be the right direction in FIG. 1.

(3) Based on a real X-motor torque command signal and a real Z-motor torque command signal in the simulation in the paragraph (2), the active mass damper control system is simulated, and the behavior of the weight 18 is recorded.

FIGS. 5A–5G are charts showing an example of a result of the simulation.

Figure 5A:
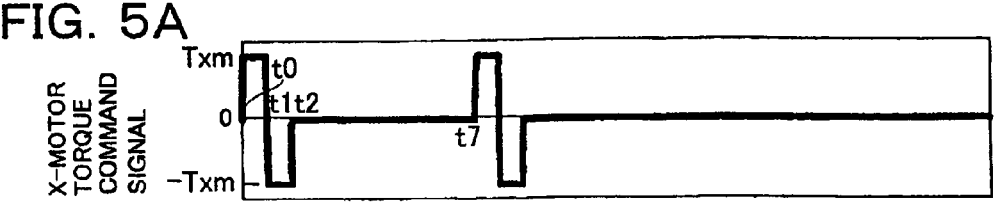
FIGS. 5A–5G are graphs showing a result of simulated behavior of a weight.

FIG. 5A shows a second-order time derivative signal of an X-table position command signal similarly to FIG. 4C, which signal shows an ideal X-motor torque command signal.

Figure 5B:
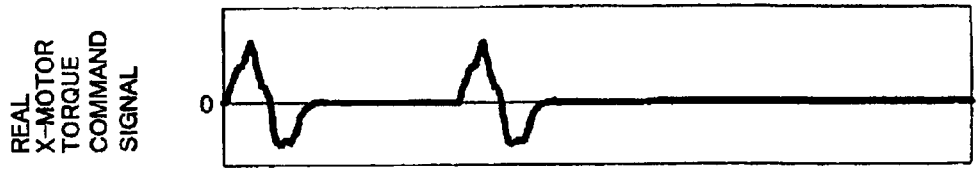

FIG. 5B shows a real X-motor torque command signal when the X-table 7 was driven in accordance with the X-table position command signal. That is, even when a signal having a waveform shown in FIG. 5A is input as an X-motor torque command signal, the real X-motor torque command signal has a waveform shown in FIG. 5B due to a response delay of the X-table positioning control system.

Figure 5C:
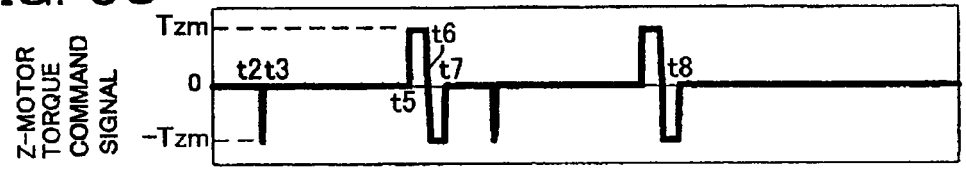

FIG. 5C shows a second-order time derivative signal of a Z-table position command signal similarly to FIG. 4D, which signal shows an ideal Z-motor torque command signal.

Figure 5D:
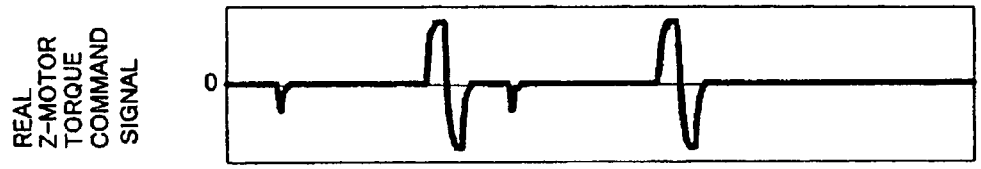

FIG. 5D shows a real Z-motor torque command signal when the Z-table 207 was driven in accordance with the Z-table position command signal. That is, in the same manner as in the X-motor, even when a signal having a waveform shown in FIG. 5C is input as a Z-motor torque command signal, the real Z-motor torque command signal has a waveform shown in FIG. 5D due to a response delay of the Z-table positioning control system.

Figure 5E:
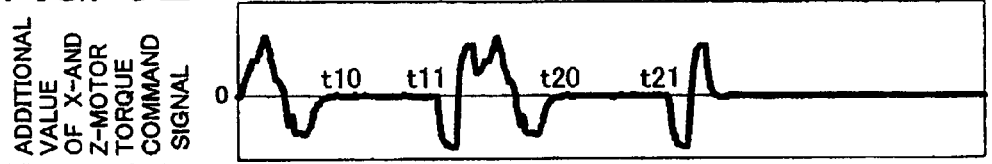

FIG. 5E shows an output signal obtained by adding a value obtained by multiplying the X-motor torque command signal 60 in FIG. 3 by a coefficient value defined in the coefficient multiplier 300, to a value obtained by multiplying the Z-motor torque command signal 160 by a coefficient value defined in the coefficient multiplier 301, by means of the adder 302.

In FIG. 1, when the X-table 7 is moved to right (the X-motor torque signal is positive), a counterclockwise force (rocking force) acts on the drilling machine. On the other hand, when the Z-table is moved downward (the Z-motor torque signal is positive), a clockwise force (rocking force) acts on the drilling machine. Here, therefore, the coefficient value of the coefficient multiplier 300 is set to be positive, and the coefficient value of the coefficient multiplier 301 is set to be negative, so that the polarity of each torque value agrees with the direction of the corresponding rocking force.

Figure 5F:
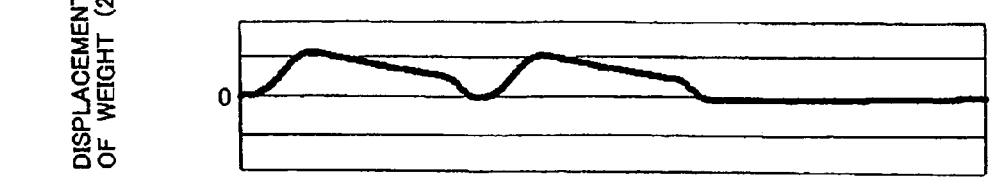

FIG. 5F shows a displacement of the weight 18 driven based on the signal shown in FIG. 5E with suitable values set in the coefficient multipliers 47 and 49 (that is, for feeding back the velocity and the displacement). As shown in FIG. 5F, the displacement of the weight 18 approaches zero (origin) gradually in a period (between t10 and t11 or between t20 and t21 in FIG. 5E) in which the additional value of the X-motor torque command signal and the Z-motor torque command signal is substantially zero.

Figure 5G:
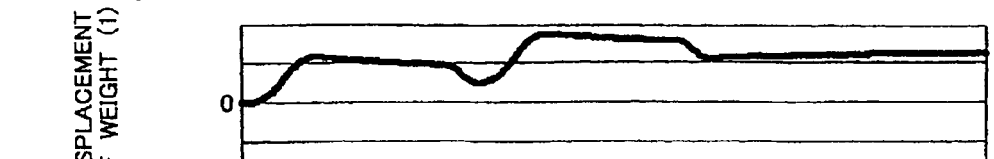

FIG. 5G is provided for explaining the effect of the invention. FIG. 5G shows a response when the values of the coefficient multipliers 47 and 49 are zero, that is, when the velocity and the displacement are not fed back. As shown in FIG. 5G, if the velocity and the displacement are not fed back, the displacement of the weight 18 will increase whenever the X-table 7 moves. Accordingly, in order to prevent the weight 18 from colliding with its moving terminal, it is necessary to increase the movable distance of the weight 18 or to perform maintenance and inspection frequently.

When the weight of the X-table 7 or the height-direction position of the X-table 7 changes, the rocking force acting on the drilling machine 2 changes in spite of one and the same X-motor torque signal. The same thing can be applied to the Z-table. Therefore, the absolute values of the coefficients set in the coefficient multipliers 300 and 301 are determined based on the weight of the X-table 7 and the weight of the Z-table 207, their attachment-position dimensions, etc.

As has been described above, when the active mass damper according to the invention is applied to the drilling machine, rocking vibration generated due to sudden acceleration/deceleration of the Z-table can be prevented so that the X-table 7 does not vibrate. Thus, the machining accuracy can be improved.

In addition, even when the weight 18 is moved repeatedly in accordance with the movements of the X-table 7 and the Z-table 207, the weight 18 can be moved from the vicinity of its origin. Accordingly, the active mass damper can be downsized. As a result, the active mass damper can be easily retrofitted to a drilling machine which has been already in operation and which has no active mass damper.

In this embodiment, the torque of the motor 11*b* is controlled by the driver 41 using the X-motor torque command signal output from the X-motor driver 43 and the Z-motor torque command signal output from the Z-motor driver 243. However, a velocity control signal of the X-table 7 output from the controller 42 and a velocity control signal of the Z-table 207 output from the controller 242 may be used for controlling the weight 18 so that the driver 41 can control the velocity of the motor 11*b*.

This embodiment has been described about the case where only one active mass damper 3 is provided. However, active mass dampers 3 may be disposed on the opposite sides of the bed 6. When the active mass dampers 3 are disposed on the opposite sides of the bed 6, only a horizontal force can be applied to the bed 6. Thus, superior effect can be obtained in comparison with the case where only one active mass damper 3 is provided.

What is claimed is:

1. An active mass damper comprising:
   a support unit for supporting a weight movably horizontally;
   a weight drive unit for driving said weight; and
   a controller for controlling said weight drive unit; wherein:
   said active mass damper is disposed in a machining apparatus so that a movable direction of said weight is parallel to a movable direction of a first movable portion of said machining apparatus; and
   said controller drives said weight drive unit so as to suppress vibration generated in said machining apparatus, employing feed-forward control using a torque command signal given to a drive portion of said first movable portion and a torque command signal given to a drive portion of another movable portion different in movable direction from said first movable portion, and feedback control based on a displacement of said weight.

* * * * *